United States Patent
Binette et al.

(10) Patent No.: US 10,245,470 B1
(45) Date of Patent: Apr. 2, 2019

(54) GOLF BALL COMPOSITIONS COMPRISING THERMOPLASTIC POLYURETHANE IONOMERS

(71) Applicant: Acushnet Company, Fairhaven, MA (US)

(72) Inventors: Mark L. Binette, Mattapoisett, MA (US); Michael J. Sullivan, Old Lyme, CT (US); Robert Blink, Newport, RI (US); Brian Comeau, Berkley, MA (US); David A. Bulpett, Boston, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 15/843,091

(22) Filed: Dec. 15, 2017

(51) Int. Cl.
*A63B 37/06* (2006.01)
*A63B 37/00* (2006.01)

(52) U.S. Cl.
CPC ...... *A63B 37/0058* (2013.01); *A63B 37/0031* (2013.01); *A63B 37/0059* (2013.01); *A63B 37/0062* (2013.01); *A63B 37/0075* (2013.01)

(58) Field of Classification Search
CPC .................. A63B 37/0058; A63B 37/0051
USPC .................................................. 473/371, 373
See application file for complete search history.

(56) References Cited

U.S. PATENT DOCUMENTS

| 6,949,604 B2 | 9/2005 | Risen et al. |
| 2016/0347900 A1 | 12/2016 | Becker et al. |

*Primary Examiner* — Raeann Gorden
(74) *Attorney, Agent, or Firm* — Mandi B. Milbank

(57) ABSTRACT

The present invention provides a golf ball comprising an inner core and an outer cover layer, wherein at least one of the inner core and outer cover layer is formed from a thermoplastic polyurethane ionomer.

10 Claims, No Drawings

GOLF BALL COMPOSITIONS COMPRISING THERMOPLASTIC POLYURETHANE IONOMERS

FIELD OF THE INVENTION

The present invention relates to golf balls having at least one layer formed from a thermoplastic polyurethane ionomer composition. The polyurethane ionomer includes an ionic monomer that is covalently bonded to the polyurethane ionomer backbone and comprises a sulfonate containing polyol and a quaternary ammonium counterion.

BACKGROUND OF THE INVENTION

Polyurethane ionomers are well known. One example is disclosed in U.S. Patent Application Publication No. 2016/0347900 to Becker et al., which is directed to a thermoplastic polyurethane ionomer containing the residue of an ionic monomer comprising a sulfonate containing polyol and a quaternary ammonium counterion, the ionic monomer having been covalently bonded into the backbone of the thermoplastic polyurethane ionomer.

The use of polyurethane ionomers to produce articles, including golf balls, has been disclosed in U.S. Pat. No. 6,949,604 to Risen, Jr, et al., which is directed to a polyurethane ionomer blend composition.

The present invention provides a novel golf ball construction wherein a polyurethane ionomer composition is used to form the inner core, inner cover layer, or outer cover layer of a golf ball.

SUMMARY OF THE INVENTION

The present invention is directed to a golf ball comprising an inner core layer, an outer cover layer, and, optionally, one or more layers disposed between the inner core layer and the outer cover layer, wherein at least one layer is formed from a thermoplastic polyurethane ionomer composition. The thermoplastic polyurethane ionomer composition includes an ionic monomer covalently bonded to the polyurethane ionomer backbone. The ionic monomer comprises a sulfonate containing polyol and a quaternary ammonium counterion.

In a particular embodiment, the inner core layer is formed from the thermoplastic polyurethane ionomer composition and has an outer surface hardness of 85 Shore C or less. The golf ball additionally comprises an outer core layer formed from a thermoset rubber composition and having an outer surface hardness of 50 Shore C or greater. The outer surface hardness of the outer core layer is greater than the outer surface hardness of the inner core layer.

In another particular embodiment, the outer cover layer is formed from the thermoplastic polyurethane ionomer composition and has an outer surface hardness of from 20 Shore D to 63 Shore D. The golf ball additionally comprises an inner cover layer formed from an E/X- or E/X/Y-type ionomer composition and having an outer surface hardness of greater than 55 Shore D.

In another particular embodiment, the layer formed from the thermoplastic polyurethane ionomer composition is an inner cover layer. The outer cover layer is formed from an E/X- or E/X/Y-type ionomer composition and has an outer surface hardness of 55 Shore D or greater. The inner cover layer has an outer surface hardness that is less than the outer surface hardness of the outer cover layer, and the difference between the outer surface hardness of the inner cover layer and the outer surface hardness of the outer cover layer is 3 Shore D units or greater.

DETAILED DESCRIPTION OF THE INVENTION

Golf balls of the present invention have at least one layer formed from a thermoplastic polyurethane ionomer composition.

Thermoplastic Polyurethane (TPU) Ionomer

Thermoplastic polyurethane (TPU) ionomers of the present invention contain an ionic monomer formed of a sulfonate containing polyol ion and a quaternary ammonium counterion that have been covalently bonded with one or more diisocyanates to form the backbone of the TPU ionomer. The sulfonate containing polyol ion is not particularly limited and may be any polyol monomer having sulfonate functionality that is capable of simultaneously bonding with diisocyanates and complexing with a quaternary ammonium counterion. In a particular embodiment, the sulfonate containing polyol ion is selected from N,N-bis(2-hydroxyethyl)-2-aminoethanesulfonic acid (BES); N,N-bis(2-hydroxypropyl)-2-aminoethanesulfonic acid; N,N-bis(2-hydroxybutyl)-2-aminoethanesulfonic acid; butyl ethyl propylene glycol (BEPG); and trimethylolpropane monoallyl ether (TMPME). Non-limiting examples of suitable quaternary ammonium counterions that form a complex with the sulfonate containing polyol anion are those having the formula:

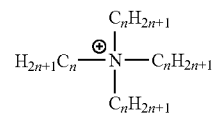

wherein n is an integer from 1 to 18 with the condition that no more than three of the four $C_nH_{2n+1}$ side groups on the quaternary ammonium counterion can be methyl groups (i.e., n=1). Particularly suitable quaternary ammonium counterions include, but are not limited to, didodecyldimethylammonium (DDA), tetrahexylammonium (THA), terakis (decyl) ammonium (TDA), trimethyloctadecylammonium, hexadecyltrimethylammonium, tetradecyltrimethylammonium, dodecyltrimethylammonium, decyltrimethylammonium, trimethyloctyl ammonium, hexyltrimethylammonium, dimethyldioctadecylammonium, dihexadecyldimethylammonium, dimethylditetradecylammonium, didodecyldimethylammonium, didecyldimethylammonium, methyltrioctadecylammonium, tridodecylmethylammonium, tricaprylylmethylammonium methyltrioctylammonium, tributylmethylammonium, tetraoctadecylammonium, tetrahexadecylammonium, tetradodecylammonium, tetrakis (decyl) ammonium, tetraoctylammonium, tetraheptylammonium, tetrahexylammonium, tetrabutylammonium, and combinations of two or more thereof.

The ionic monomer is typically present in an amount of from about 0.5 wt % to about 30 wt %, based on the total weight of the TPU ionomer. The quaternary ammonium counterion is typically present in an amount of from about 0.5 wt % to about 30 wt %, based on the total weight of the TPU ionomer.

Ionic monomers formed of a sulfonate containing polyol ion and a quaternary ammonium counterion, TPU ionomers formed therefrom, and the process for manufacturing such TPU ionomers, are further disclosed, for example, in U.S. Patent Application Publication No. 2016/0347900 to Becker et al., the entire disclosure of which is hereby incorporated herein by reference.

Thermoplastic polyurethane (TPU) ionomers of the present invention are prepared by combining the ionic monomer, a polyurethane prepolymer, and a chain extender. Polyurethane prepolymers are the reaction product of a polyol with an excess amount of an isocyanate. Suitable isocyanates for forming the polyurethane prepolymer include aliphatic, cycloaliphatic, aromatic aliphatic, derivatives thereof, and combinations of two or more thereof having two or more isocyanate (NCO) groups per molecule. The isocyanates may be organic, modified organic, organic polyisocyanate-terminated prepolymers, or a combination thereof. The isocyanate may be any isocyanate-functional monomer, dimer, trimer, or multimeric adduct thereof, prepolymer, quasi-prepolymer, or combination of two or more thereof. Suitable isocyanate-functional compounds also include any monoisocyanate or polyisocyanate that includes any isocyanate functionality of two or more.

Suitable diisocyanates include those having the general formula NCO—R—NCO, where R is preferably a cyclic or linear or branched hydrocarbon moiety containing from 1 to 20 carbon atoms. When multiple cyclic groups are present, linear and/or branched hydrocarbons containing from 1 to 10 carbon atoms can be present as spacers between the cyclic groups. In some cases, the cyclic group(s) may be substituted at the 2-, 3-, and/or 4-positions, respectively. Substituted groups may include, but are not limited to, halogens, primary, secondary, or tertiary hydrocarbon groups, or combinations thereof.

Non-limiting examples of particularly suitable unsaturated isocyanates, i.e., aromatic compounds, include 2,2'-, 2,4'-, and 4,4'-diphenylmethane diisocyanate (MDI); 3,3'-dimethyl-4,4'-biphenyl diisocyanate (TODI); toluene diisocyanate (TDI); polymeric MDI; carbodimide-modified liquid 4,4'-diphenylmethane diisocyanate; para-phenylene diisocyanate (PPDI); meta-phenylene diisocyanate (MPDI); triphenylmethane-4,4'-, and triphenylmethane-4,4''-triisocyanate; napthylene-1,5,-diisocyanate; 2,4'-, 4,4'-, and 2,2'-biphenyl diisocyanate; polyphenylene polymethylene polyisocyanate (PMDI) (also known as polymeric PMDI); and combinations of two or more thereof.

Non-limiting examples of particularly suitable saturated isocyanates include ethylene diisocyanate; propylene-1,2-diisocyanate; tetramethylene diisocyanate; tetramethylene-1,4-diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); triisocyanate of HDI; triisocyanate of 2,4,4-trimethyl-1,6-hexane diisocyanate (TMDI); 4,4'-dicyclohexylmethane diisocyanate (H12MDI); 2,4-hexahydrotoluene diisocyanate; 2,6-hexahydrotoluene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uretdione of any polyisocyanate, such as uretdione of toluene diisocyanate, uretdione of hexamethylene diisocyanate, and combinations thereof; modified polyisocyanate derived from the above isocyanates and polyisocyanates; and combinations of two or more thereof.

In a particular embodiment, the isocyanate is MDI.

Suitable polyols for forming the polyurethane prepolymer include, but are not limited to, polyether polyols, polycaprolactone polyols, polyester polyols, polycarbonate polyols, and hydrocarbon polyols. The hydrocarbon chain of the polyol can have saturated or unsaturated bonds, or substituted or unsubstituted aromatic and cyclic groups.

Suitable polyether polyols include, but are not limited to, polytetramethylene ether glycol (PTMEG); copolymers of polytetramethylene ether glycol and 2-methyl-1,4-butane diol (PTG-L); poly(oxyethylene) glycol; poly(oxypropylene) glycol; ethylene oxide capped (polyoxypropylene) glycol; poly(oxypropylene oxyethylene) glycol; and combinations of two or more thereof.

Suitable polycaprolactone polyols include, but are not limited to, diethylene glycol initiated polycaprolactone; propylene glycol initiated polycaprolactone; 1,4-butanediol initiated polycaprolactone; 1,6-hexanediol initiated polycaprolactone; trimethylol propane initiated polycaprolactone; neopentyl glycol initiated polycaprolactone; polytetramethylene ether glycol initiated polycaprolactone; ethylene glycol initiated polycaprolactone; dipropylene glycol initiated polycaprolactone; and combinations of two or more thereof.

Suitable polyester polyols include, but are not limited to, polyethylene adipate glycol; polyethylene propylene adipate glycol; polybutylene adipate glycol; polyethylene butylene adipate glycol; polyhexamethylene adipate glycol; polyhexamethylene butylene adipate glycol; o-phthalate-1,6-hexanediol polyester polyol; polyethylene terephthalate polyester polyols; and combinations of two or more thereof.

Suitable polycarbonate polyols include, but are not limited to, poly(phthalate carbonate) glycol, poly(hexamethylene carbonate) glycol, polycarbonate polyols containing bisphenol A, and combinations of two or more thereof.

Suitable hydrocarbon polyols include, but are not limited to, hydroxy-terminated liquid isoprene rubber (LIR), hydroxy-terminated polybutadiene polyol, hydroxy-terminated polyolefin polyols, hydroxy-terminated hydrocarbon polyols, and combinations of two or more thereof.

Other polyols that may be used to form the prepolymer include, but are not limited to, glycerols; castor oil and its derivatives; Polytail™ H and Polytail™ HA polyhydroxy polyolefin oligomers, commercially available from Mitsubishi Chemical; acrylic polyols; acid functionalized polyols based on a carboxylic, sulfonic, or phosphoric acid group; dimer alcohols converted from the saturated dimerized fatty acid; and combinations of two or more thereof.

By using polyols based on a hydrophobic backbone, the TPU ionomer composition may be more water resistant than those using polyols without a hydrophobic backbone. Non-limiting examples of suitable polyols based on a hydrophobic backbone include hydrocarbon polyols, hydroxy-terminated polybutadiene polyols, polyethers, polycaprolactones, and polyesters.

In a particular embodiment, the polyol used to form the polyurethane prepolymer is PTMEG.

The polyurethane prepolymer and ionic monomer are reacted with a chain extender. The chain extender may consist of a single chain extender or comprise a combination of two or more chain extenders, and optionally includes a freezing point depressing agent. Suitable chain extenders include, but are not limited to, hydroxy-terminated chain extenders, amine-terminated chain extenders, and combinations thereof. The chain extender may be saturated or unsaturated.

Non-limiting examples of suitable chain extenders include 1,4-butanediol; 1,3-butanediol; 1,2-butanediol; 2,3-butanediol; 2,3-dimethyl-2,3-butanediol; propylene glycol; dipropylene glycol; polypropylene glycol; 2-methyl-1,3-propanediol; 2-methyl-1,4-butanediol; ethylene glycol; diethylene glycol; polyethylene glycol; resorcinol-di(beta-hydroxyethyl)ether and its derivatives; hydroquinone-di(beta-hydroxyethyl)ether and derivatives thereof; 2-propanol-1,1'-phenylaminobis; trimethylolpropane; 4,4'-methylenebis(2-chloroaniline); 3,5-dimethylthio-2,4-toluenediamine; 3,5-dimethylthio-2,6-toluenediamine; 4,4'-methylenebis(2-ethylaniline); 4,4'-bis-(sec-butylamino)-diphenylmethane; 1,3-bis-(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-bis-(sec-butylamino) benzene; 1,2-bis-(sec-butylamino)benzene; 3,5-diethyltoluene-2,4-diamine; 3,5-diethyltoluene-2,6-diamine; tetra-(2-hydroxypropyl)-ethylenediamine; N,N'-dialkyldiamino diphenyl methane; trimethyleneglycol-di-p-aminobenzoate; polytetramethyleneoxide-di-p-aminobenzoate; 4,4'-methylene bis-(3-chloro-2,6-diethylaniline); 1,4-cyclohexyldimethylol; 2-methylpentamethylene diamine; isomers and mixtures of diaminocyclohexane; isomers and mixtures of cyclohexane bis(methylamine); polytetramethylene ether glycol; isomers and mixtures of cyclohexyldimethylol; triisopropanolamine; diethylene triamine; triethylene tetramine; tetraethylene pentamine; propylene diamine; dipropylene triamine; 1,3-diaminopropane; dimethylamino propylamine; diethylamino propylamine; diethylene glycol bis-(aminopropyl) ether; imido-bis-(propylamine); monoethanolamine; diethanolamine; triethanolamine; monoisopropanolamine; diisopropanolamine; isophoronediamine; N,N'-diisopropyl-isophoronediamine; polyoxypropylene triamine; propylene oxide-based triamine; 3,3'-dimethyl-4,4'-diaminocyclohexylmethane; 1,5-pentanediol; 1,6-hexanediol; glycerol; 1,3-bis-(2-hydroxyethoxy)cyclohexane; 1,3-bis-[2-(2-hydroxyethoxy)ethoxy]cyclohexane; 1,3-bis-{2-[2-(2-hydroxyethoxy)ethoxy]ethoxy}cyclohexane; N,N,N',N'-tetra-(2-hydroxypropyl-ethylene) diamine; ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane and derivatives thereof; 1,4-bis-(sec-butylamino)-cyclohexane; 1,2-bis-(sec-butylamino)-cyclohexane; 4,4'-dicyclohexylmethane diamine; and combinations thereof.

In a particular embodiment, the chain extender is a dimethylthiotoluenediamine, e.g., Ethacure® 300 curative comprising dimethylthiotoluenediamine with a minor amount of monomethylthiotoluenediamine, commercially available from Albemarle Corporation.

The chain extender optionally comprises a freezing point depressing agent so that the freezing point of the blend is less than its normal freezing point temperature. The freezing point depressing agent is preferably compatible with the chain extender. For example, hydroxy-terminated chain extenders, such as 1,4-butanediol, may be modified with a hydroxy-terminated freezing point depressing agent or a mixture of hydroxy-terminated freezing point depression agents. Examples of hydroxy-terminated freezing point depressing agents include, but are not limited to, 1,3-propanediol, 2-methyl-1,3-propanediol, 2-methyl-1,4-butanediol, 1,2-butanediol, 1,3-butanediol, ethylene glycol, diethylene glycol, 1,5-pentanediol, polytetramethylene glycol, propylene glycol, dipropylene glycol, and combinations thereof. Similarly, amine-terminated chain extenders, such as hexamethylene diamine, may be modified with an amine-terminated freezing point depressing agent or a mixture of amine-terminated freezing point depressing agents. Examples of amine-terminated freezing point depressing agents include, but are not limited to, ethylene diamine, 1,3-diaminopropane, dimethylamino propylamine, tetraethylene pentamine, 1,2-propylenediamine, diethylaminopropylamine, 2,2,4-trimethyl-1,6-hexanediamine, 2,4,4-trimethyl-1,6-hexanediamine, and combinations thereof. The freezing point depressing agent is preferably added in an amount sufficient to reduce the freezing point of the chain extender by a suitable amount to prevent loss of pigment dispersion, but not affect the physical properties of the golf ball. Freezing point depressing agents are further disclosed, for example, in U.S. Pat. No. 7,888,449 to Wu, the entire disclosure of which is hereby incorporated herein by reference.

Suitable isocyanates, polyols, and chain extenders are further disclosed, for example, in U.S. Pat. No. 8,674,051 to Wu et al.; U.S. Pat. No. 9,295,881 to Michalewich et al.; U.S. Pat. No. 6,528,578 to Wu; U.S. Pat. No. 6,506,851 to Wu; U.S. Pat. No. 7,148,278 to Bulpett et al.; and U.S. Patent Application Publication No. 2012/0286449 to Michalewich et al.; the entire disclosures of which are hereby incorporated herein by reference.

A catalyst is optionally employed to promote the reaction between the polyol and the isocyanate, and/or the reaction between the prepolymer and the chain extender. Suitable catalysts include, but are not limited to bismuth catalysts; zinc octoate; stannous octoate; tin catalysts, e.g., bis-butyltin dilaurate, bis-butyltin diacetate, stannous octoate, tin (II) chloride, tin (IV) chloride, bis-butyltin dimethoxide, dimethyl-bis[1-oxonedecyl)oxy]stannane, and di-n-octyltin bis-isooctyl mercaptoacetate; amine catalysts, e.g., triethylenediamine, triethylamine, and tributylamine; organic acids, e.g., oleic acid and acetic acid; delayed catalysts, e.g., Polycat® catalysts, commercially available from Air Products and Chemicals, Inc.; and combinations thereof.

Additives and fillers are optionally included in the TPU ionomer composition. Suitable additives include, but are not limited to, wetting agents, coloring agents, optical brighteners, crosslinking agents, whitening agents (e.g., $TiO_2$ and ZnO), conventional UV absorbers (e.g., titanium dioxide, zinc oxide, barium sulfate, violet, Paliogen® Blue L 6385 indanthrone blue pigment, ultra marine blue, etc.), hindered amine light stabilizers, defoaming agents, processing aids, surfactants, and other conventional additives. Antioxidants, stabilizers, softening agents, plasticizers (including internal and external plasticizers), impact modifiers, foaming agents, density-adjusting fillers, reinforcing materials, and compatibilizers may also be added to the composition. Fillers may be added to the TPU ionomer composition to affect rheological and mixing properties, the specific gravity (i.e., density-modifying fillers), the modulus, the tear strength, reinforcement, and the like. The fillers are generally inorganic, and typically include numerous metals, metal oxides and salts, e.g., zinc oxide, tin oxide, calcium oxide, barium sulfate, zinc sulfate, calcium carbonate, zinc carbonate, barium carbonate, clay, tungsten, tungsten carbide, silica, regrind (recycled core material typically ground to about 30 mesh particle), high-Mooney-viscosity rubber regrind, and combinations thereof.

Golf Ball Constructions

Golf balls of the present invention comprise an inner core layer, an outer cover layer, and, optionally, one or more intermediate layers disposed between the inner core layer and the outer cover layer, wherein at least one layer is formed from a TPU ionomer composition.

In one embodiment, the inner core layer is formed from a TPU ionomer composition. In another embodiment, the outer cover layer is formed from a TPU ionomer composition. In another embodiment, the golf ball includes an inner cover layer disposed between the inner core layer and the outer cover layer, and the inner cover layer is formed from a TPU ionomer composition.

Conventional golf ball compositions may be used to form the layer(s) not formed from a TPU ionomer composition. Particularly suitable core layer materials include, but are not limited to, thermosetting materials, such as styrene butadiene, polybutadiene, isoprene, polyisoprene, and trans-isoprene; thermoplastics, such as ionomer resins, polyamides and polyesters; and thermoplastic and thermosetting polyurethane and polyureas. Particularly preferred core compositions are thermosetting rubber compositions comprising a base polymer, an initiator agent, a coagent and/or a curing agent, and optionally one or more of a metal oxide, metal fatty acid or fatty acid, antioxidant, soft and fast agent, fillers, and additives. Suitable base polymers include natural and synthetic rubbers including, but not limited to, polybutadiene, polyisoprene, ethylene propylene rubber ("EPR"), styrene-butadiene rubber, styrenic block copolymer rubbers (such as SI, SIS, SB, SBS, SIBS, and the like, where "S" is styrene, "I" is isobutylene, and "B" is butadiene), butyl rubber, halobutyl rubber, polystyrene elastomers, polyethylene elastomers, polyurethane elastomers, polyurea elastomers, metallocene-catalyzed elastomers and plastomers, copolymers of isobutylene and para-alkylstyrene, halogenated copolymers of isobutylene and para-alkylstyrene, acrylonitrile butadiene rubber, polychloroprene, alkyl acrylate rubber, chlorinated isoprene rubber, acrylonitrile chlorinated isoprene rubber, polyalkenamers, and combinations of two or more thereof. Suitable initiator agents include organic peroxides, high energy radiation sources capable of generating free radicals, C—C initiators, and combinations thereof. Suitable coagents include, but are not limited to, metal salts of unsaturated carboxylic acids; unsaturated vinyl compounds and polyfunctional monomers (e.g., trimethylolpropane trimethacrylate); phenylene bismaleimide; and combinations thereof. Suitable curing agents include, but are not limited to, sulfur; N-oxydiethylene 2-benzothiazole sulfenamide; N,N-di-ortho-tolylguanidine; bismuth dimethyldithiocarbamate; N-cyclohexyl 2-benzothiazole sulfenamide; N,N-diphenylguanidine; 4-morpholinyl-2-benzothiazole disulfide; dipentamethylenethiuram hexasulfide; thiuram disulfides; mercaptobenzothiazoles; sulfenamides; dithiocarbamates; thiuram sulfides; guanidines; thioureas; xanthates; dithiophosphates; aldehyde-amines; dibenzothiazyl disulfide; tetraethylthiuram disulfide; tetrabutylthiuram disulfide; and combinations thereof. Suitable types and amounts of base polymer, initiator agent, coagent, filler, and additives are more fully described in, for example, U.S. Pat. Nos. 6,566,483, 6,695,718, 6,939,907, 7,041,721 and 7,138,460, the entire disclosures of which are hereby incorporated herein by reference. Particularly suitable diene rubber compositions are further disclosed, for example, in U.S. Patent Application Publication No. 2007/0093318, the entire disclosure of which is hereby incorporated herein by reference.

Particularly suitable cover layer materials include, but are not limited to:

a) polyurethanes, polyureas, and hybrids of polyurethane and polyurea;

b) E/X- and E/X/Y-type ionomers, wherein E is an olefin (e.g., ethylene), X is a carboxylic acid (e.g., acrylic, methacrylic, crotonic, maleic, fumaric, or itaconic acid), and Y is a softening comonomer (e.g., vinyl esters of aliphatic carboxylic acids wherein the acid has from 2 to 10 carbons, alkyl ethers wherein the alkyl group has from 1 to 10 carbons, and alkyl alkylacrylates such as alkyl methacrylates wherein the alkyl group has from 1 to 10 carbons), such as Surlyn® ionomer resins and DuPont® HPF 1000 and HPF 2000, commercially available from E. I. du Pont de Nemours and Company, Iotek® ionomers, commercially available from ExxonMobil Chemical Company, Amplify® IO ionomers of ethylene acrylic acid copolymers, commercially available from The Dow Chemical Company, and Clarix® ionomer resins, commercially available from A. Schulman Inc.;

c) polyisoprene;

d) polyoctenamer, such as Vestenamer® polyoctenamer, commercially available from Evonik Industries;

e) polyethylene, including, for example, low density polyethylene, linear low density polyethylene, and high density polyethylene; polypropylene;

f) rubber-toughened olefin polymers; non-ionomeric acid copolymers, e.g., (meth)acrylic acid, which do not become part of an ionomeric copolymer;

g) plastomers;

h) flexomers;

i) styrene/butadiene/styrene block copolymers;

j) styrene/ethylene-butylene/styrene block copolymers;

k) polybutadiene;

l) styrene butadiene rubber;

m) ethylene propylene rubber;

n) ethylene propylene diene rubber;

o) dynamically vulcanized elastomers;

p) ethylene vinyl acetates;

q) ethylene (meth) acrylates;

r) polyvinyl chloride resins;

s) polyamides, amide-ester elastomers, and copolymers of ionomer and polyamide, including, for example, Pebax® thermoplastic polyether and polyester amides, commercially available from Arkema Inc;

t) crosslinked trans-polyisoprene;

u) polyester-based thermoplastic elastomers, such as Hytrel® polyester elastomers, commercially available from E. I. du Pont de Nemours and Company, and Riteflex® polyester elastomers, commercially available from Ticona;

v) polyurethane-based thermoplastic elastomers, such as Elastollan® polyurethanes, commercially available from BASF;

w) synthetic or natural vulcanized rubber;

x) and combinations thereof.

Compositions comprising an ionomer or a blend of two or more E/X- and E/X/Y-type ionomers are particularly suitable conventional cover materials. Preferred E/X- and E/X/Y-type ionomeric cover compositions include:

(a) a composition comprising a "high acid ionomer" (i.e., having an acid content of greater than 16 wt %), such as Surlyn 8150®;
(b) a composition comprising a high acid ionomer and a maleic anhydride-grafted non-ionomeric polymer (e.g., Fusabond® functionalized polymers). A particularly preferred blend of high acid ionomer and maleic anhydride-grafted polymer is a 84 wt %/16 wt % blend of Surlyn 8150® and Fusabond®. Blends of high acid ionomers with maleic anhydride-grafted polymers are further disclosed, for example, in U.S. Pat. Nos. 6,992,135 and 6,677,401, the entire disclosures of which are hereby incorporated herein by reference;
(c) a composition comprising a 50/45/5 blend of Surlyn® 8940/Surlyn® 9650/Nucrel® 960, preferably having a material hardness of from 80 to 85 Shore C;
(d) a composition comprising a 50/25/25 blend of Surlyn® 8940/Surlyn® 9650/Surlyn® 9910, preferably having a material hardness of about 90 Shore C;
(e) a composition comprising a 50/50 blend of Surlyn® 8940/Surlyn® 9650, preferably having a material hardness of about 86 Shore C;
(f) a composition comprising a blend of Surlyn® 7940/Surlyn® 8940, optionally including a melt flow modifier;
(g) a composition comprising a blend of a first high acid ionomer and a second high acid ionomer, wherein the first high acid ionomer is neutralized with a different cation than the second high acid ionomer (e.g., 50/50 blend of Surlyn® 8150 and Surlyn® 9150), optionally including one or more melt flow modifiers such as an ionomer, ethylene-acid copolymer or ester terpolymer; and
(h) a composition comprising a blend of a first high acid ionomer and a second high acid ionomer, wherein the first high acid ionomer is neutralized with a different cation than the second high acid ionomer, and from 0 to 10 wt % of an ethylene/acid/ester ionomer wherein the ethylene/acid/ester ionomer is neutralized with the same cation as either the first high acid ionomer or the second high acid ionomer or a different cation than the first and second high acid ionomers (e.g., a blend of 40-50 wt % Surlyn® 8140, 40-50 wt % Surlyn® 9120, and 0-10 wt % Surlyn® 6320).

Surlyn 8150°, Surlyn® 8940, and Surlyn® 8140 are different grades of E/MAA copolymer in which the acid groups have been partially neutralized with sodium ions. Surlyn® 9650, Surlyn® 9910, Surlyn® 9150, and Surlyn® 9120 are different grades of E/MAA copolymer in which the acid groups have been partially neutralized with zinc ions. Surlyn® 7940 is an E/MAA copolymer in which the acid groups have been partially neutralized with lithium ions. Surlyn® 6320 is a very low modulus magnesium ionomer with a medium acid content. Nucrel® 960 is an E/MAA copolymer resin nominally made with 15 wt % methacrylic acid. Surlyn® ionomers, Fusabond® polymers, and Nucrel® copolymers are commercially available from E. I. du Pont de Nemours and Company.

Suitable E/X- and E/X/Y-type ionomeric cover materials are further disclosed, for example, in U.S. Pat. Nos. 6,653,382, 6,756,436, 6,894,098, 6,919,393, and 6,953,820, the entire disclosures of which are hereby incorporated by reference.

Suitable polyurethanes, polyureas, and blends and hybrids of polyurethane/polyurea are further disclosed, for example, in U.S. Pat. Nos. 5,334,673, 5,484,870, 6,506,851, 6,756,436, 6,835,794, 6,867,279, 6,960,630, and 7,105,623; U.S. Patent Application Publication No. 2009/0011868; and U.S. Patent Application No. 60/401,047, the entire disclosures of which are hereby incorporated herein by reference. Suitable polyurethane-urea cover materials include polyurethane/polyurea blends and copolymers comprising urethane and urea segments, as disclosed in U.S. Patent Application Publication No. 2007/0117923, the entire disclosure of which is hereby incorporated herein by reference.

Cover compositions may include one or more filler(s), such as titanium dioxide, barium sulfate, etc., and/or additive(s), such as coloring agents, fluorescent agents, whitening agents, antioxidants, dispersants, UV absorbers, light stabilizers, plasticizers, surfactants, compatibility agents, foaming agents, reinforcing agents, release agents, and the like.

Suitable cover materials and constructions also include, but are not limited to, those disclosed in U.S. Patent Application Publication No. 2005/0164810, U.S. Pat. Nos. 5,919,100, 6,117,025, 6,767,940, and 6,960,630, and PCT Publications WO00/23519 and WO00/29129, the entire disclosures of which are hereby incorporated herein by reference.

In a particular embodiment, the present invention is directed to a golf ball comprising an inner core layer, an outer core layer, and a cover. The inner core layer has an outer surface hardness of 85 Shore C or less, or 80 Shore C or less, or 75 Shore C or less, and is formed from a TPU ionomer composition of the present invention. The outer core layer has an outer surface hardness of 40 Shore C or greater, or 50 Shore C or greater, or 65 Shore C or greater, or 75 Shore C or greater, or 85 Shore C or greater, and is formed from a thermoset rubber composition. The outer surface hardness of the outer core layer is greater than the outer surface hardness of the inner core layer.

In another particular embodiment, the present invention is directed to a golf ball comprising an inner core layer, an inner cover layer, and an outer cover layer. The inner cover layer has an outer surface hardness of greater than 55 Shore D, or 60 Shore D or greater, or 65 Shore D or greater, and is formed from an E/X- or E/X/Y-type ionomer composition. The outer cover layer has an outer surface hardness of 20 or 30 or 40 or 55 or 58 or 60 or 63 Shore D, or an outer surface hardness within a range having a lower limit and an upper limit selected from these values, and is formed from a TPU ionomer composition of the present invention.

In another particular embodiment, the present invention is directed to a golf ball comprising an inner core layer, an inner cover layer, and an outer cover layer. The inner cover layer is formed from a TPU ionomer composition of the present invention. The outer cover layer has an outer surface hardness of 55 Shore D or greater, or 60 Shore D or greater, or 65 Shore D or greater, and is formed from an E/X- or E/X/Y-type ionomer composition. The inner cover layer has an outer surface hardness that is less than the outer surface hardness of the outer cover layer, and the difference between the outer surface hardness of the inner cover layer and the outer surface hardness of the outer cover layer is 3 Shore D units or greater, or 5 Shore D units or greater, or 7 Shore D units or greater.

The outer surface hardness of a golf ball layer is obtained from the average of a number of measurements taken from opposing hemispheres, taking care to avoid making measurements on the parting line of the core or on surface defects, such as holes or protrusions. Hardness measurements are made pursuant to ASTM D-2240 using a calibrated, digital durometer, capable of reading to 0.1 hardness units and set to record the maximum hardness reading obtained for each measurement.

When numerical lower limits and numerical upper limits are set forth herein, it is contemplated that any combination of these values may be used.

All patents, publications, test procedures, and other references cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

What is claimed is:

1. A golf ball comprising:
   an inner core layer having an outer surface hardness of 85 Shore C or less and formed from a thermoplastic polyurethane ionomer composition,
   an outer core layer having an outer surface hardness of 50 Shore C or greater and formed from a thermoset rubber composition, and
   a cover;
   wherein the thermoplastic polyurethane ionomer composition of the inner core layer includes an ionic monomer covalently bonded to the polyurethane ionomer backbone, and wherein the ionic monomer comprises a sulfonate containing polyol ion and a quaternary ammonium counterion; and
   wherein the outer surface hardness of the outer core layer is greater than the outer surface hardness of the inner core layer.

2. The golf ball of claim 1, wherein the sulfonate containing polyol is an ionic diol.

3. The golf ball of claim 1, wherein the sulfonate containing polyol ion is N,N-bis(2-hydroxyethyl)-2-aminoethanesulfonic acid.

4. The golf ball of claim 1, wherein the quaternary ammonium counterion is an alkyl ammonium cation.

5. The golf ball of claim 1, wherein the quaternary ammonium counterion is selected from the group consisting of didodecyldimethylammonium, tetrahexylammonium, terakis (decyl) ammonium, trimethyloctadecylammonium, hexadecyltrimethylammonium, tetradecyltrimethylammonium, dodecyltrimethylammonium, decyltrimethylammonium, trimethyloctyl ammonium, hexyltrimethylammonium, dimethyldioctadecylammonium, dihexadecyldimethylammonium, dimethylditetradecylammonium, didodecyldimethylammonium, didecyldimethylammonium, methyltrioctadecylammonium, tridodecylmethylammonium, tricaprylylmethylammonium methyltrioctylammonium, tributylmethyl ammonium, tetraoctadecylammonium, tetrahexadecylammonium, tetradodecylammonium, tetrakis (decyl) ammonium, tetraoctyl ammonium, tetraheptylammonium, tetrahexylammonium, tetrabutylammonium, and combinations of two or more thereof.

6. The golf ball of claim 1, wherein the outer surface hardness of the inner core layer is 80 Shore C or less.

7. The golf ball of claim 1, wherein the outer surface hardness of the inner core layer is 75 Shore C or less.

8. The golf ball of claim 1, wherein the outer surface hardness of the outer core layer is 65 Shore C or greater.

9. The golf ball of claim 1, wherein the outer surface hardness of the outer core layer is 75 Shore C or greater.

10. The golf ball of claim 1, wherein the outer surface hardness of the outer core layer is 85 Shore C or greater.

* * * * *